May 13, 1941.  C. R. REUTER  2,242,184
FLUID TRANSMISSION SYSTEM
Filed Sept. 12, 1938  2 Sheets-Sheet 2

Carl R. Reuter
INVENTOR.

BY

ATTORNEY.

Patented May 13, 1941

2,242,184

UNITED STATES PATENT OFFICE 2,242,184

FLUID TRANSMISSION SYSTEM

Carl R. Reuter, Milwaukee, Wis., assignor to The Falk Corporation, Milwaukee, Wis., a corporation of Wisconsin Application September 12, 1938, Serial No. 229,436

6 Claims. (Cl. 137—69)

This invention relates to fluid transmission systems for use primarily in the control of fluid clutches, brakes, chucks and other rotating fluid controlled devices.

Fluid transmission systems for that purpose commonly involve a joint having a part stationary and a part rotatable with the controlled device, the joint ordinarily serving not only to initially transmit the pressure, but also to sustain the pressure during extended periods of operation of the device. This relative rotation between parts under the pressures involved is a common source of serious wear rendering such systems and such devices impracticable for many uses to which they might otherwise be advantageously applied.

An object of the present invention is to avoid the above objections in a fluid transmission system for the purpose mentioned.

A more specific object is to provide an improved system for the purpose in which the joint may be relieved of wear producing pressures during operation of the controlled device.

Another object is to provide an improved self-sealing joint for fluid pressure systems of the character mentioned.

Other more specific objects and advantages will appear, expressed or implied, from the following description of illustrative embodiments of the present invention.

Figure 1:
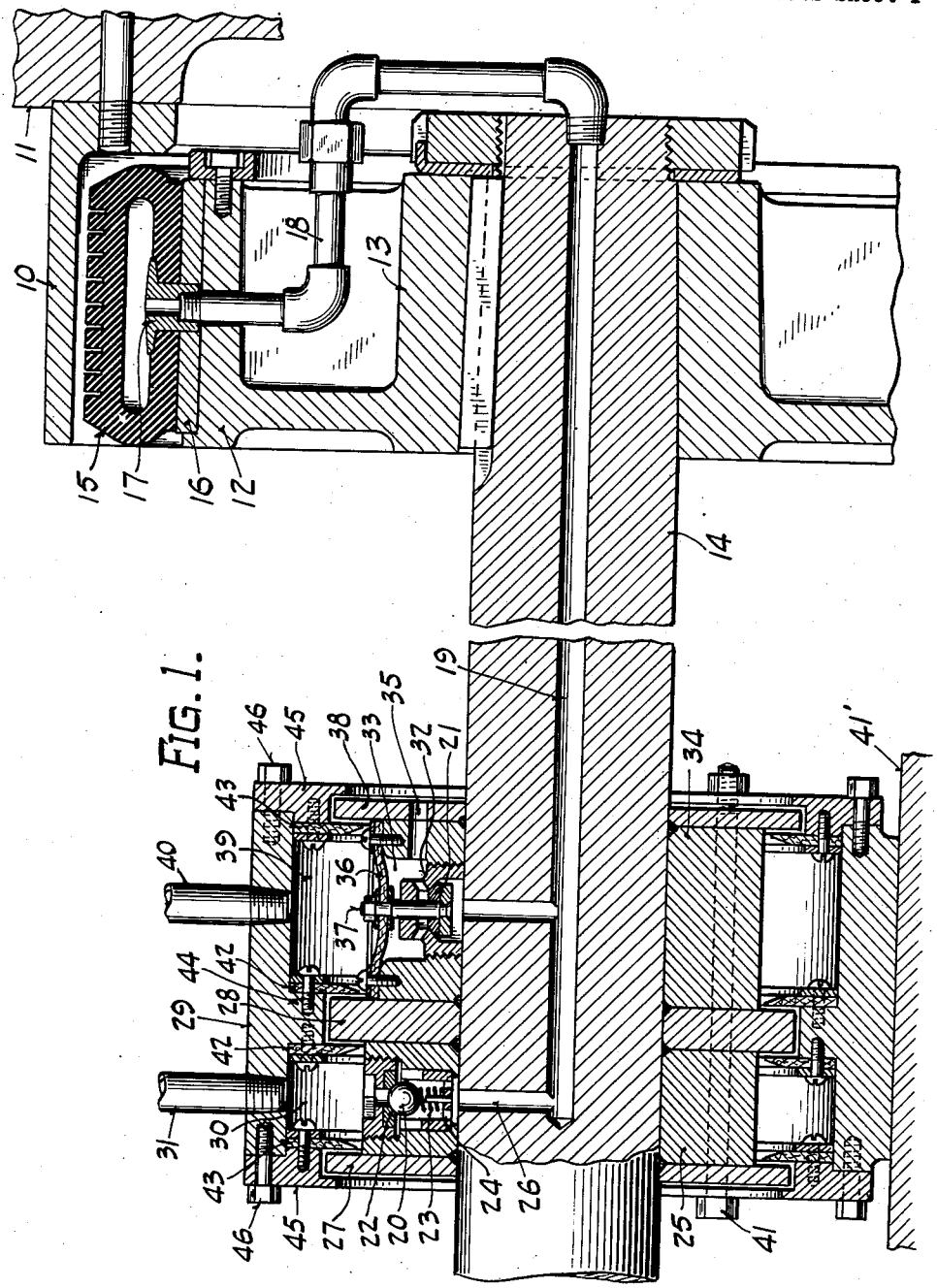
Figure 1 is a sectional view of a fluid clutch equipped with a fluid control system constructed in accordance with the present invention.

The clutch shown in Fig. 1 comprises an outer drum 10 fixed for rotation with an engine fly wheel 11, and a concentric inner drum 12 having a supporting hub 13 fixed to the end of a shaft 14. The inner drum 12 is radially spaced from the outer drum 10 and carries an annular fluid container 15 adapted to be expanded by the admission of fluid pressure into gripping contact with the inner face of the drum 10.

The fluid container 15 is preferably of rubber and fabric or cord construction similar to that used in modern automobile or truck tires, and is preferably of somewhat flattened form to reduce the depth of the annular space between the two drums and to provide, when expanded, a relatively wide area of gripping contact between it and the outer drum.

The container 15 is shown vulcanized or otherwise surface bonded to a carrier ring 16 removably fixed to the inner drum 12, and is provided with an appropriate hollow fitting 17 separably connected through appropriate piping 18 with a channel 19 in the shaft 14 through which fluid pressure may be admitted to expand the container and thereby close the clutch or released from the container to contract the same and thereby open the clutch.

Application and release of fluid pressure to and from the channel 19 in the shaft is placed under the control of a novel system which will now be described. It includes an appropriate pressure inlet valve 20 rotatable with the shaft 14 and operable to admit and normally retain fluid pressure in the channel 19, and an appropriate exhaust valve 21 also rotatable with the shaft and operable to release the fluid pressure in the channel 19.

In the system shown in Fig. 1, the valve 20 is in the form of an inwardly opening ball check valve normally retained against its ported seat 22 by a spring 23 interposed between it and an appropriate valve cage 24, the ball and cage being arranged within a chamber formed in a collar 25 fixed to the shaft 14 and communicating through a channel 26 with the channel 19. The collar 25 is confined between two end rings 27 and 28 which also rotate with the shaft and which cooperate with an encircling non-rotating structure 29 to form an annular pressure transmitting space 30 to which the ported valve seat 22 is exposed. Fluid pressure may be admitted to the space 30 through a pipe 31.

The exhaust valve shown at 21 is in the form of an inwardly opening poppet valve mounted in a suitable cage 32 in a chamber 33 formed in a collar 34 fixed to the shaft 14. The chamber 33 has an exhaust port 35. This valve is normally retained in closed position by a flexible diaphragm 36 mounted to span and close the chamber 33, the valve having a supporting stem 37 attached to the diaphragm at its center.

The collar 34 is confined between the ring 28 above mentioned and a ring 38 also fixed to the shaft 14, the rings 28 and 38 also cooperating with the encircling, non-rotating, cylindrical structure 29 to form a second annular pressure transmitting space 39 to which the diaphragm 36 is exposed. Fluid pressure may be admitted to the space 39 through a pipe 40.

The collars 25 and 34 and associated rings 27, 28, and 38 are preferably securely fixed together by appropriate means, such as through bolts 41, so that they rotate as a unit with the shaft 14.

The non-rotating cylindrical structure 29 is preferably separately mounted concentrically of the shaft for support either by the shaft or by an independent anchorage, such as conventionally indicated at 41', ample running clearances being provided between the rings 27, 28 and 38 and the non-rotating structure, as indicated in the drawings, so as to avoid wearing contact between the rotating and non-rotating parts.

The arrangement is such that fluid pressure, supplied from an appropriate source through the pipe 31 to the chamber 30 in the stationary structure 29, passes the check valve 20 and through the channels 26 and 19 and pipe 18 into the container 15 to expand the latter and thereby close the clutch. The clutch is then maintained closed by the automatic closing of the valve 20 which serves to maintain the pressure in the channel 19 and container 15. To release the clutch, pressure is transmitted to the chamber 39 through the pipe 40, thereby to further depress the diaphragm 36 and thus open the valve 21 so as to open the channel 19 to the exhaust port 35.

Provision is made for momentarily sealing the chambers 30 and 39 during those brief periods of time when the clutch is being closed and when it is being opened. For that purpose a pair of annular sealing rings 42 and 43 is mounted in each of the chambers 30 and 39 respectively. Each of these rings is of leather, or other good and preferably flexible sealing material, rings 42 being attached along their outer margins to opposite sides of a rib 44 which projects radially inwardly from the structure 29 opposite the ring 28, and rings 43 being similarly attached to the inner surfaces of end rings 45 removably fixed by bolts 46 or otherwise to ends of the structure 29 opposite the rings 27 and 38 respectively. Rings 42 extend inwardly into close proximity and in overlapping relation with the ring 28 so as to be pressed into sealing contact with the latter when one or the other of the chambers 30 or 39 is exposed to pressure, and rings 43 are similarly disposed with respect to the end rings 27 and 38 for the same purpose.

It will thus be noted that the stationary structure 29, including the inwardly projecting rings 45 and rib 44, cooperates with the rotating structure, including the rings 27, 28, and 38 and intermediate collars 25 and 34, to form a fluid transmitting joint capable of accommodating rotation of the shaft 14 and which is effectively sealed by the flexible rings 42 and 43 during those brief time intervals when the joint is exposed to fluid pressure, namely—during the closing and opening of the clutch. It will also be noted that since the pressure which maintains the clutch closed is sustained by the valves 20 and 21 which rotate with the shaft, it is unnecessary to maintain fluid pressure in the joint while the clutch is closed, so that the sealing rings 42 and 43 are not exposed to pressure and consequent wearing contact with the rings 27, 28, and 38 during those extended periods of time during which the clutch is closed and the shaft 14 operating.

Figure 2:
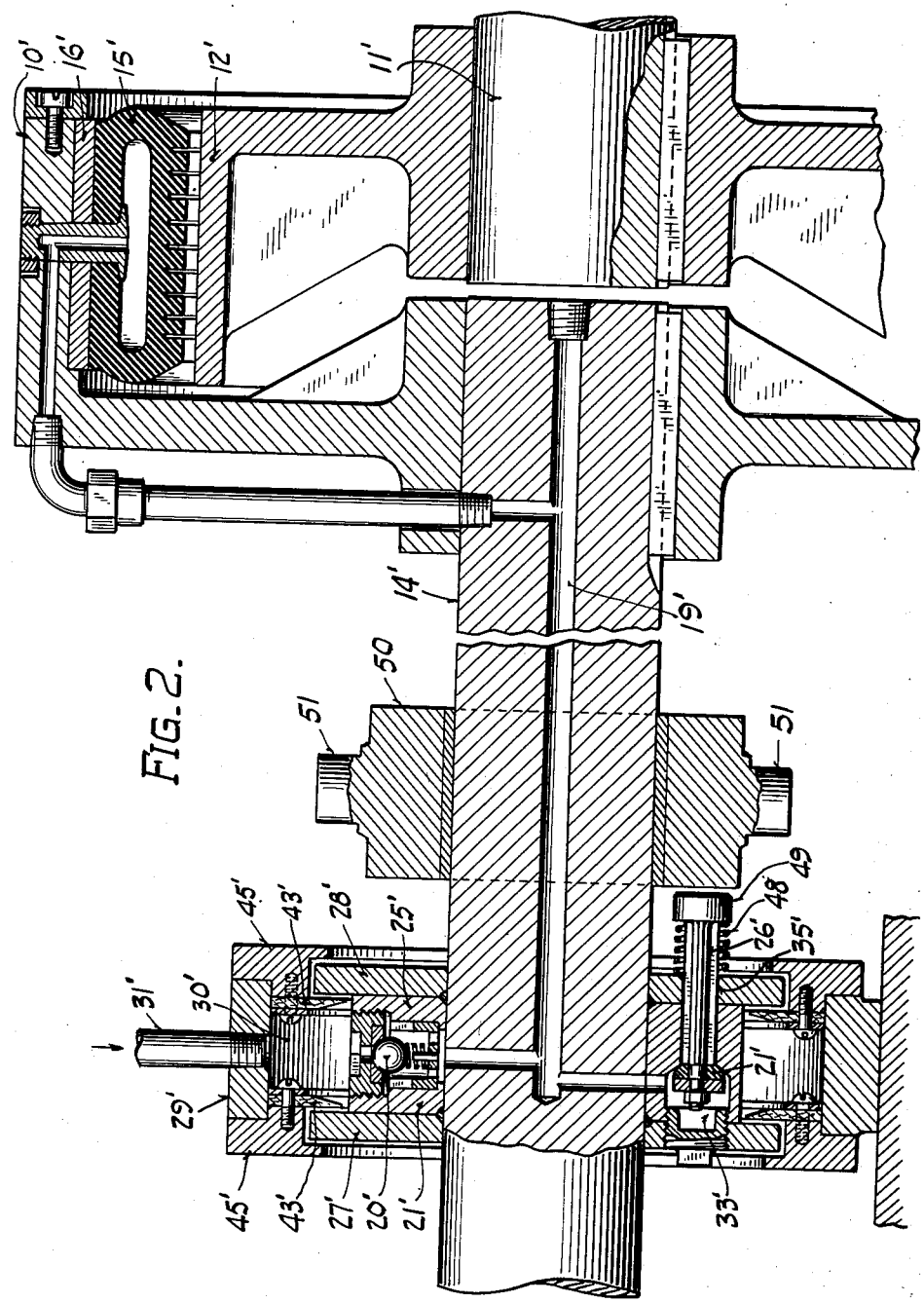
Fig. 2 is a similar view of a modified form of fluid clutch equipped with a different form of fluid control system embodying the invention.

The clutch shown in Fig. 2 is similar to that of Fig. 1, except that the expansible fluid container 15' is surface bonded to a ring 16' removably fixed to an outer drum 10' carried by the shaft 14' and expandable into gripping contact with an inner drum 12' carried on a separate shaft 11'. In this arrangement centrifugal force is utilized to contract the container 15' away from the drum 12' when the pressure therein is released. In this instance, the pressure in the container 15' is controlled through a channel 19' in the shaft 14' by means which will now be described.

The control system shown in Fig. 2 comprises a fluid transmission system similar to that hereinabove described but including a mechanically tripped instead of a fluid tripped pressure release valve. It comprises an inwardly opening ball check valve 20' arranged within a collar 25' fixed to rotate with the shaft 14', and controlling communication between the channel 19' and a fluid transmitting chamber 30' formed between the collar 25' and a non-rotating surrounding cylinder 29' and between the rotating rings 27' and 28' and the stationary rings 45'. The chamber 30' is supplied with fluid pressure through a pipe 31' and intermittently sealed by the flexible rings 43' carried by the rings 45' and pressed into sealing engagement with the rings 27' and 28' only when the chamber 30' is exposed to pressure; all constructed and arranged to operate in the manner above described.

In this instance, however, the collar 25' also carries a pressure release valve 21' arranged within a chamber 33' which communicates with the channel 19'. The valve 21' shown is in the form of an inwardly opening poppet valve having a stem 26' longitudinally finned and guided in an exhaust channel 35'. A spring 48 interposed between the ring 28' and a head 49 on the valve stem yieldably retains the valve 21' in the closed position shown. The valve 21' may be forced into open position by appropriate means such as a non-rotating control collar 50 slidably mounted on the shaft 14' in a manner to contact the head 49 and force the valve from its seat. The collar 50 may be manually actuated and controlled by appropriate means, such as a conventional yoke and trunnion arrangement, the trunnions being indicated at 51.

The arrangement is such that fluid pressure admitted to the chamber 30' through the pipe 31', first acts on the sealing rings 43' to seal the chamber, and then passes the valve 20' to and through the channel 19' to close the clutch, the valve 20' thereafter closing to sustain the clutch closing pressure. As soon as the pressure in the pipe 31' is released, the pressure on the sealing rings 43' is relieved so as to avoid wearing pressure contact between them and the rings 27' and 28'. Finally when it is desired to reopen the clutch, the collar 50 is shifted against the head 49 so as to depress the valve 21' into open position, whereupon the pressure in the container 15' escapes through the channel 19' and port 35', and the container assisted by the centrifugal forces acting thereon contracts away from the inner drum 12' to thereby completely open the clutch.

Various changes may be made in either embodiment of the invention hereinabove specifically described without departing from or sacrificing the advantages of the invention as defined in the appended claims.

I claim:

1. In a control system for a rotary fluid pressure container, the combination of means for transmitting fluid pressure to and from said container during rotation thereof, said means including two chamber-forming members one rotatable with said container and with respect to the other of said members, means rotatable with said container for sustaining the fluid pressure therein, said last named means including a valve operable to release the fluid pressure in said container, and means operable independently of the fluid pressure in said container for operating said valve during rotation of said container.

2. In a control system for a rotary fluid pressure container, the combination of means for transmitting fluid pressure to said container during rotation thereof, valve means rotatable with said container and operable to admit and sustain fluid pressure therein, additional valve means rotatable with said container and operable to release the fluid pressure therein, and means for operating said valve independently of the fluid pressure in said container during rotation thereof.

3. In a control system for a rotary fluid container, the combination of means rotatable with said container and normally effective to sustain fluid pressure in the latter, means for transmitting fluid pressure to and through said first named means to said container during rotation of the latter, and means rotatable with said container and operable to release the fluid pressure therein, and means non-rotatable with said container for operating said last named means during rotation of said container.

4. In a control system for a rotary fluid pressure container, the combination of means rotatable with said container and normally effective to sustain fluid pressure therein, means operable during rotation of said container for transmitting fluid pressure to and through said first named means to said container, and fluid actuated means operable independently of the fluid pressure in said container to release said fluid pressure.

5. In a control system for a rotary fluid pressure container, the combination of means including a fluid actuated valve rotatable with said container for transmitting and sustaining fluid pressure to and in the latter, and a separate fluid actuated valve operable independently of fluid pressure in said container and rotatable with said container for releasing the fluid pressure therein.

6. In a control system for a rotary fluid pressure container, the combination of means including a fluid actuated valve rotatable with said container for transmitting and sustaining fluid pressure to and in the latter, a valve rotatable with said container operable to release fluid pressure from the latter, and means non-rotatable with said container for operating said last named valve during rotation of said container.

CARL R. REUTER.